(12) United States Patent
Pillai et al.

(10) Patent No.: US 8,858,733 B2
(45) Date of Patent: Oct. 14, 2014

(54) LASER HARDENED SURFACE FOR WEAR AND CORROSION RESISTANCE

(75) Inventors: Raju Pillai, Pasadena, TX (US); Jiinjen Albert Sue, The Woodlands, TX (US); Unnikrishnan Vasudevan, Pearland, TX (US)

(73) Assignee: National Oilwell Varco, L.P., Houston, TX (US)

( * ) Notice: Subject to any disclaimer, the term of this patent is extended or adjusted under 35 U.S.C. 154(b) by 463 days.

(21) Appl. No.: 13/238,326

(22) Filed: Sep. 21, 2011

(65) Prior Publication Data

US 2013/0068741 A1 Mar. 21, 2013

(51) Int. Cl.
*C21D 1/09* (2006.01)
*B23K 26/00* (2014.01)
*B23K 26/08* (2014.01)

(52) U.S. Cl.
CPC ............... *B23K 26/0066* (2013.01); *C21D 1/09* (2013.01); *B23K 26/0012* (2013.01); *B23K 26/0009* (2013.01); *B23K 2201/16* (2013.01); *B23K 2201/04* (2013.01); *B23K 26/08* (2013.01); *B23K 26/0015* (2013.01)
USPC .......................... 148/95; 219/121.85; 148/565

(58) Field of Classification Search
CPC ....... C21D 1/09; B23K 26/06; B23K 26/0066
USPC ............................... 148/512, 903; 219/121.85
See application file for complete search history.

(56) References Cited

U.S. PATENT DOCUMENTS

| | | | | |
|---|---|---|---|---|
| 4,122,240 A | * | 10/1978 | Banas et al. | 428/655 |
| 4,212,900 A | * | 7/1980 | Serlin | 148/241 |
| 4,708,752 A | | 11/1987 | Kar | |
| 5,143,557 A | | 9/1992 | Pierantoni et al. | |

FOREIGN PATENT DOCUMENTS

| | | |
|---|---|---|
| JP | 64-39318 | 2/1989 |
| JP | 1039318 A | 2/1989 |
| KR | 20110067980 A | 6/2011 |

OTHER PUBLICATIONS

Foreign Communication from a Related Counterpart Application—International Search Report and Written Opinion, PCT/US2012/045355, Dec. 21, 2012.

* cited by examiner

*Primary Examiner* — Samuel M Heinrich
(74) *Attorney, Agent, or Firm* — Conley Rose, P.C.

(57) ABSTRACT

A method of laser hardening comprises irradiating a surface of a component with a laser beam to form a first band of irradiated material, irradiating the surface of the component with the laser beam to form a second band of irradiated material that overlaps the first band of irradiated material, where the first band and the second band have a pitch to width ratio of between about 0.5 and about 0.78.

20 Claims, 5 Drawing Sheets

LASER HARDENED SURFACE FOR WEAR AND CORROSION RESISTANCE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Conventionally, thermal treatment techniques may be used to enhance the surface of a component to improve the wear, corrosion, and fatigue resistance of the component in use. Various thermal treatment techniques have been used including induction hardening and flame hardening. In these processes, a surface is heated and rapidly cooled in a quench process to provide a phase transformation in the material, which thereby provides the enhanced surface properties. In induction hardening, a coil disposed about a component is used along with a high frequency signal to induce the heating of the component. Similarly, a direct heating method, such as a flame heating method, may directly expose a component to a heat source to heat the surface. In these and similar methods, the component is heated to a desired temperature and then rapidly cooled to provide a material change in the surface layer of the component. Typical quenching methods can include directly contacting the surface with a coolant such as water or oil.

However, processes involving heating and quenching can present processing complications. For example, the use of induction hardening and/or flame heating can make it difficult to obtain deep heating in irregularly shaped components. This irregular heating may lead to non-uniform hardening of the treated surface. Further, the rapid quenching of a heated component often causes deformation, distortion, or cracking of the component. Various subsequent processing steps such as straightening and milling may then be required to return the component to the original configuration. These finishing steps may increase the overall processing costs associated with the preparation of the component in addition to increasing the complexity of the processing line needed to produce the component.

SUMMARY OF THE DISCLOSED EMBODIMENTS

In an embodiment, a method of laser hardening comprises irradiating a surface of a component with a laser beam to form a first band of irradiated material, irradiating the surface of the component with the laser beam to form a second band of irradiated material that overlaps the first band of irradiated material, where the first band and the second band have a pitch to width ratio of between about 0.5 and about 0.78.

In an embodiment, a method of laser hardening comprises irradiating a surface of a component with a laser beam to form a plurality of adjacent bands of irradiated material, where adjacent bands of the plurality of bands overlap to define an overlap area therebetween, the plurality of adjacent bands have a hardened depth, the overlap area has a double-hardened depth, and a ratio of the double-hardened depth to the hardened depth is greater than U.

In an embodiment, a method of laser hardening consisting essentially of providing a component comprising a surface formed from a metallic material, and irradiating the surface with a laser beam to form a plurality of bands of irradiated material, where the plurality of bands of irradiated material have a pitch to width ratio of between about 0.5 and about 0.78.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description.

DETAILED DESCRIPTION OF THE DISCLOSED EMBODIMENTS

Figure 1:
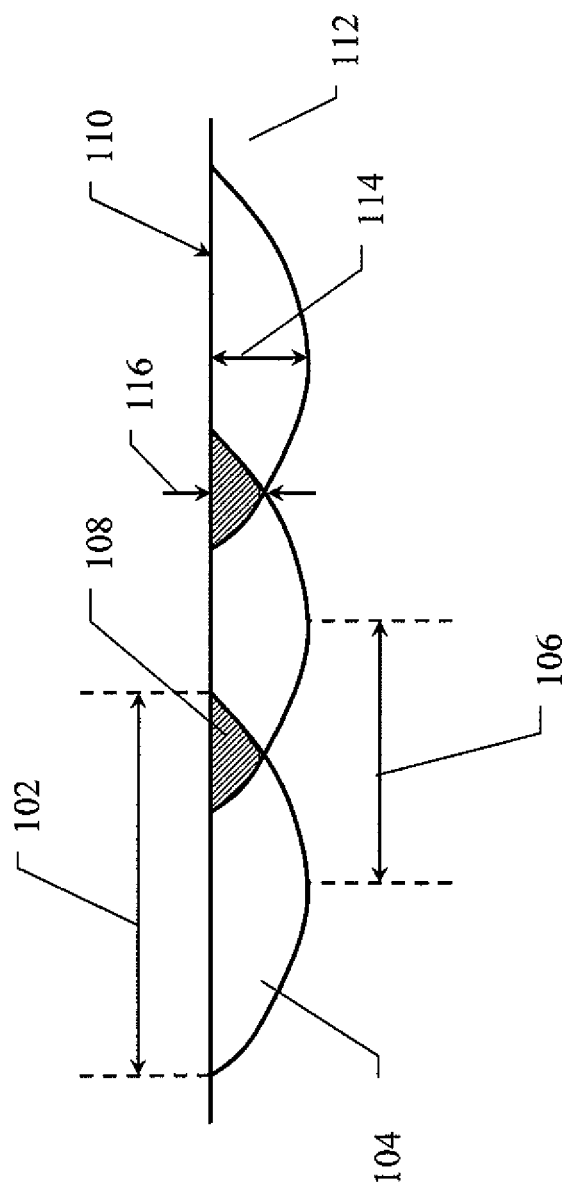
FIG. 1 is a cross-sectional illustration of a hardened material profile of a component according to an embodiment.

In the drawings and description that follow, like parts are typically marked throughout the specification and drawings with the same reference numerals, respectively. The drawing figures are not necessarily to scale. Certain features of the disclosed embodiments may be shown exaggerated in scale or in somewhat schematic form, and some details of conventional elements may not be shown in the interest of clarity and conciseness.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and mean "including, but not limited to . . . ."

In order to reduce the number of complications associated with traditional surface treatment processes, laser hardening may be used to enhance the surface properties of a component. Using a laser beam as a heat source, a surface may be irradiated and rapidly heated. The bulk of the component may act as a heat sink and extract heat from the surface. The rapid heating and cooling effected by the heat transfer to the remainder of the component may provide the heating and quench steps with minimal or negligible distortions of the component. In addition, the laser hardening process may be more precise than traditional techniques while still providing a high processing speed. For example, a surface may be treated with one or more lasers to provide a pass-by-pass treatment of a surface. This process may reduce the need for any post-treatment procedures such as straightening or milling. By controlling the timing and placement of the laser passes and bands of irradiated material, the hardness, depth, and uniformity of the hardness and depth may be improved relative to a surface treated using traditional techniques.

A laser hardening method described herein may generally comprise irradiating a surface with a laser beam to form a plurality of bands of irradiated material. Each band of irradiated material may be heated and quenched to create a zone of enhanced surface properties (e.g., an improved hardness), as described in more detail herein. In the areas in which the plurality of bands overlap, the hardness of the band may be tempered on the second or subsequent heating, thereby reducing the hardness to some degree. As a result, the hardness within a direct hardened zone may be higher than the hardness within a double-hardened zone. Using the methods described herein, the differences in hardness and depth can be controlled to produce a component with a relatively uniform surface hardness produced to a desired hardened depth.

The systems and methods disclosed herein generally comprise irradiating a surface of a component with a laser beam. Various components may be processed using the laser hardening processes described herein and generally comprise one or more metallic components capable of undergoing a structural transformation when exposed to a heating and cooling cycle. For example, various steels are known to undergo various phase transformations (e.g., the formation of austenite, martensite, etc.) resulting in the alteration of the steel microstructure when exposed to a heating and quenching cycle. Any component capable of undergoing a structural transformation (e.g., a phase transformation) may be used with the laser hardening methods described herein.

In an embodiment, at least a portion of the component is formed of a metallic material such as carbon steel. Suitable carbon steels capable of undergoing a structural transformation are generally known and may include those alloys comprising carbon and iron, though additional elements may be present. Suitable additional elements may include, but are not limited to, nickel, chromium, molybdenum, silicon, phosphorus, manganese, vanadium, sulfur, other elements known to be used with suitable metallic compositions, and any combinations thereof. In an embodiment, the metal may comprise a chromoly steel including those of the American Iron and Steel Institute (AISI) steel grade AISI 41xx family including, but not limited to, AISI 4130, AISI 4140, AISI 4145, and/or AISI 4155. Various tools and components may be formed using the metallic materials including various wellbore and/or oilfield components including wellbore tools, drill bits, wellbore tubulars, completion assemblies, drilling and/or workover rig equipment or components, and various other oilfield related components.

Upon irradiating the surface of the component or tool, the surface may be heated so that the surface of the component in the vicinity of the irradiating beam has a temperature that is at or above the transformation temperature of the material forming the component. The laser used to irradiate the component may comprise any laser capable of producing a beam with an energy density sufficient to heat the surface of the component upon the irradiation of the surface of the component. The energy density may be selected so that the temperature remains below the melting point of the material, and in an embodiment, the energy density may be selected so that the surface is not damaged or deformed in response to the irradiation by the laser beam. In order to provide a relatively uniform heating of the surface of the component, the laser producing the laser beam may be configured to provide a uniform energy density on the surface area irradiated by the beam. In an embodiment, the irradiation of the surface may be performed such that the temperature of the surface of the component is about 100° C. to about 500° C. above the transformation temperature of the material forming the component. While the absolute temperature may vary depending on the specific composition of the material or materials used to form the component, the surface temperature may be raised to about 1200° C. to about 1600° C.

Various laser types may be used with the methods and systems described herein including, but not limited to, a YAG laser, a $CO_2$ laser, a high output direct diode laser (DDL), or any other laser capable of emitting a laser beam of sufficient energy density. In an embodiment, the laser may generally have a power output ranging from about 0.1 Kilowatts (KW) to about 10 KW, about 0.5 KW to about 6 KW, or alternatively about 1 KW to about 4 KW. The beam size may be selected to provide the desired energy density at the surface of the component based on the power output of the laser. In an embodiment, the beam size may range from about 1 millimeter (mm) to about 10 mm, about 3 mm to about 8 mm, or alternatively about 4 mm to about 6 mm, though larger beam widths than 10 mm are possible with higher output lasers.

Laser hardening systems generally include a variety of components that allow the laser to be positioned, moved, and aimed in a manual or an automated manner. For example, typical laser assemblies may comprise one or more lasers for emitting the laser beam, and an adjustment mechanism for permitting the angle and/or position of the laser to be changed relative to the component being irradiated. Additional components may include various focusing elements such as one or more lenses to allow the laser beam to be focused on a desired area with a desired incident area, which can be used to change the energy density of the beam irradiating the surface of the component. The assembly and control of the laser may be performed using known techniques.

The laser and the laser assembly may be configured to irradiate the surface of the component for a time sufficient to reach a desired temperature at a desired depth, thereby producing a hardened zone to a desired depth. In general, the phase transformation of a metallic material is a time dependent process. The process begins as the temperature of a metallographical structure increases above the transformation temperature responsive to the laser beam irradiation and continues during the time the temperature is maintained above the transformation temperature. After the laser beam irradiation is finished and no longer incident on the portion of the surface that was heated, a temperature decrease occurs due to thermal diffusion of the heat into the bulk of the component, whereby the metallographical structure is rapidly cooled. Thus, by maintaining the metallographical structure at a temperature which is at or above the transformation temperature but which is lower than the melting point for a predetermined period of time, and thereafter cooling it, the metallographical structure is transformed into a hardened-phase structure. The depth of the hardening is determined by the depth to which the material can be maintained above the transformation temperature for a sufficient period of time. While higher energy densities of the irradiating laser beam may provide more energy to increase the temperature to a higher depth, a limit is imposed by the desire not to melt or deform the material at the surface of the component. Alternatively, the surface may be irradiated for a longer period of time to allow more time for the material to undergo a phase transformation to a greater depth.

Based on the phase transformation process, the energy density and the irradiation time may be chosen to produce a desired hardness to a desired depth. When a moving laser beam is used to irradiate the surface, the rate of the laser movement relative to the surface may be selected to provide for a desired irradiation time at a given point on the surface. In an embodiment, the laser beam may travel relative to the surface of the component at a rate of greater than about 0.5 meters per minute (m/min), about 1.0 m/min, about 1.5 m/min, about 2.0 m/min, about 2.5 m/min, about 3.0 m/min, or about 3.5 m/min.

The laser beam may be used to form a plurality of irradiated bands along the surface of the component. These bands may be irradiated by the laser beam by moving the laser assembly along a stationary component and/or the component may be moved (such as rotationally or translationally) relative to the laser beam assembly. A plurality of passes of the laser may be used to form the plurality of irradiated bands on the surface of the component. The bands may be formed in any of a variety of patterns including lines, concentric circles, helical lines, spirals, or any other shape providing for adjacent irradiated bands. While the methods described herein are described in terms of a single laser performing a plurality of passes, other suitable configurations may also be used. For example, a plurality of lasers may be used to form adjacent irradiated bands. The plurality of lasers may all be the same or each laser may be of a different type, power output, beam width, and/or movement rate. Various other configurations that are capable of producing a plurality of adjacent irradiated bands may also be used with the systems and methods described herein.

The irradiation of the surface of the tool or component to produce a plurality of irradiated bands may produce a structure similar to the cross-section shown in FIG. 1. As illustrated, the surface 110 of the component 112 can be irradiated with a laser beam of width 102. The width 102 of the laser beam can result in a heating of the surface 110 and a portion of the component above the transformation temperature. When the laser beam is no longer irradiating the surface 110, the heat may conduct through the remainder of the component 112 to produce a hardened zone 104 having a width 102 approximately matching that of the laser beam. The hardened zone 104 also has a depth 114 determined, at least in part, by the temperature achieved during the irradiation and the time at which the zone is maintained above the transition temperature. As used herein, the "depth" 114 of the hardened zone 104 is defined as the depth to which the material has a hardness that is at least 90%, or alternatively 95%, of the hardness of the hardened material at the surface of the hardened zone. The center of the band of irradiated material may obtain the greatest temperature and therefore exhibit a hardened depth 114 greater than the edges of the band. The resulting cross section of the hardened zone 104 may appear as an approximately semi-circular or arcuate area.

The irradiation of the surface may be performed to allow the plurality of bands to overlap, thereby forming a double-hardened zone 108 in an overlap area between adjacent bands (i.e., the areas between adjacent hardened zones 104). The pitch 106 of the bands can be defined as the distance between the centerline of adjacent bands. The double-hardened zone 108 may be hardened on a first pass of the laser and subsequently re-heated on a subsequent pass of the laser beam. The resulting double-hardened zone 108 may include the overlapping portion of two adjacent hardened zones 104, which may be shaped similar to an inverted triangle in cross-section. Since the double-hardened zone 108 is formed by the edges of the adjacent hardened zones 104, the depth 116 of the double-hardened zone 108 may be less than the depth 114 of the hardened zone 104. As used herein, the "depth" 116 of the double-hardened zone 108 is defined as the depth to which the material has a hardness that is at least 90%, or alternatively 95%, of the hardness of the hardened material at the surface of the double-hardened zone.

The subsequent heating process may serve to form an adjacent band of hardened material and temper the material in the overlap area to form the double-hardened zone 108, thereby reducing its hardness relative to the hardened zone 104. As the measure of overlap of the plurality of bands increases (i.e., as the pitch to width ratio decreases), the hardness of the double-hardened zone 108, which may still be less than that of the hardened zone 104, may approach that of the hardness of the hardened zone 104 as the temperature of the material in the overlap zone is generally heated above the transition temperature during the second or subsequent laser beam pass. Conversely, as the measure of overlap of the plurality of bands decreases (i.e., as the pitch to width ratio increases), the hardness of the double-hardened zone 108 may be reduced relative to the hardness of the hardened zone 104 as the temperature of the material in the overlap zone experience a temperature below the transformation temperature for a longer period of time in which it may be tempered rather than undergo a hardening phase transformation. As a result, the treated surface 110 may comprise a series of hardened zones 104 having double-hardened zones 108 disposed therebetween with a reduced hardness. The component 112 may comprise the hardened zone 104 having a hardness greater than the hardness of the double-hardened zone 108, which may have a hardness greater than the hardness of the material forming the bulk of the component 112.

The depth of the hardened zones 104, 108 may vary depending on the considerations of temperature and time above the transformation temperature, as described in more detail herein. In an embodiment, a hardening of the surface of the component to a desired hardness may be achieved to a centerline depth 114 of greater than about 0.5 mm, about 0.75 mm, about 1.0 mm, about 1.25 mm, about 1.5 mm, about 1.75 mm, about 2.0 mm, about 2.25 mm, or about 2.5 mm. Based on the semi-circular or arcuate shape of the cross-section of the hardened zone 104, the remainder of the hardened zone 104 may achieve a desired hardness to a depth less than that of the centerline depth 114. The minimum hardening depth of the surface generally occurs at the depth 116 of the center of the double-hardened zone 108. In an embodiment, the double-hardened zone 108 may have a depth 116 of greater than about 0.25 mm, about 0.5 mm, about 1.0 mm, about 1.25 mm, about 1.5 mm, or about 1.75 mm. The ratio of the centerline depth 114 of the hardened zone 104 to the depth 116 of the double-hardened zone 108 may vary depending on the pitch 106 to width 102 ratio. In general, the ratio of the centerline depth 114 to the depth 116 may increase as the pitch 106 to width 102 ratio increases. The ratio of the centerline depth 116 to the depth 114 may range from about 0.1 to about 1.0, about 0.2 to about 0.9, or about 0.3 to about 0.8. In an embodiment, the hardened depth across the surface may be considered to be a "uniform depth" when the ratio of the centerline depth 116 to the depth 114 is greater than about 0.6, about 0.7, about 0.8, or about 0.9. Based on the desired hardness and depth, the pitch 106 to width 102 ratio may be selected to produce a desired hardness across the surface 110 of the component 112.

As discussed above, the hardness obtained in the hardened zone 104 may depend, at least in part, on the temperature achieved in the component during the irradiation process, the time above the transition temperature, the quench time, and/or the type of material forming the component. The various metallic materials useful with the laser hardening process described herein may each have different maximum hardness values, which may be available from various sources such as the ASM Material Handbook, 9$^{th}$ Ed. In an embodiment, the hardened zone 104 may achieve a hardness value of greater than about 56 Rockwell C, about 58 Rockwell C, about 60 Rockwell C, about 62 Rockwell C, about 62.5 Rockwell C when the metallic component is AISI 4140 steel. In an embodiment, the laser hardening system may be configured to produce a hardened zone 104 having a hardness value greater than about 70%, about 75%, about 80%, about 85%, about 90%, about 95%, or about 99% of the maximum hardness for the material forming the component. As also noted above, the double-hardened zone 108 may be tempered in the subsequent irradiation by the laser beam, thereby reducing the hardness in the double-hardened zone 108. In an embodiment, the laser hardening system may be configured to produce a double-hardened zone 108 having a hardness value greater than about 60%, about 65%, about 70%, about 75%, about 80%, about 85%, or about 90% of the maximum hardness for the material forming the component. The laser hardening process may produce a relatively uniform hardness across the surface of the component that may have a ratio of a double-hardened zone 108 hardness to a hardened zone 104 hardness of greater than about 0.6, about 0.65, about 0.7, about 0.75, about 0.8, about 0.85, about 0.9, or about 0.95.

Figure 2A:
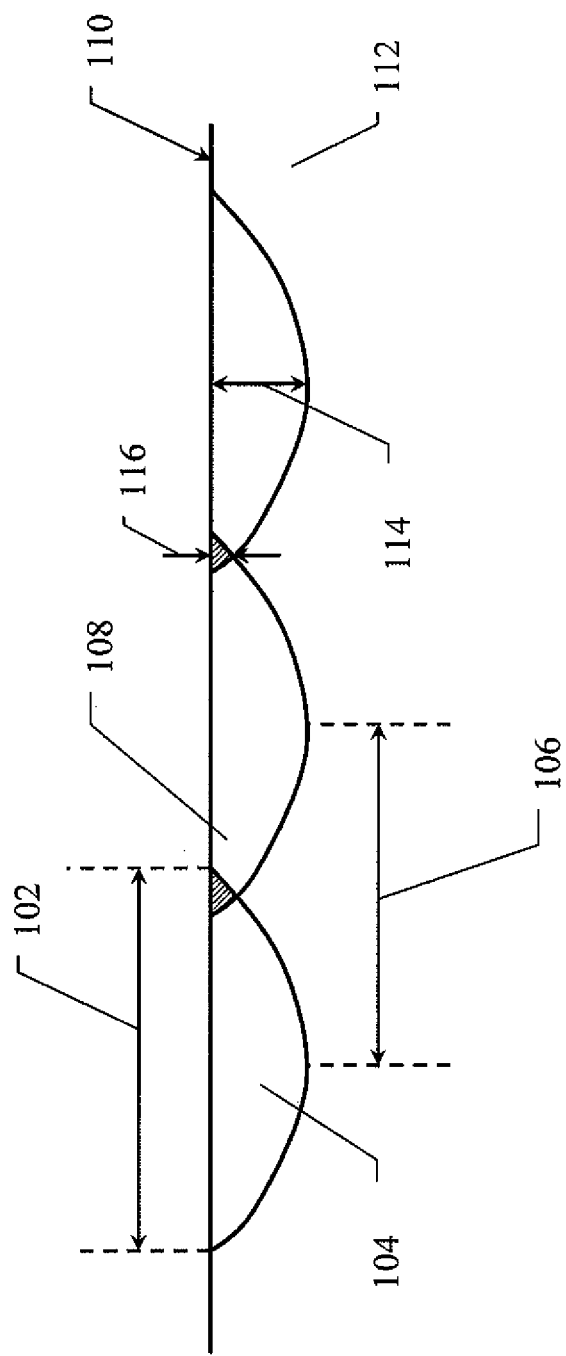
FIGS. 2A and 2B are a cross-sectional illustrations of a hardened material profile of a component according to an embodiment.
Figure 2B:
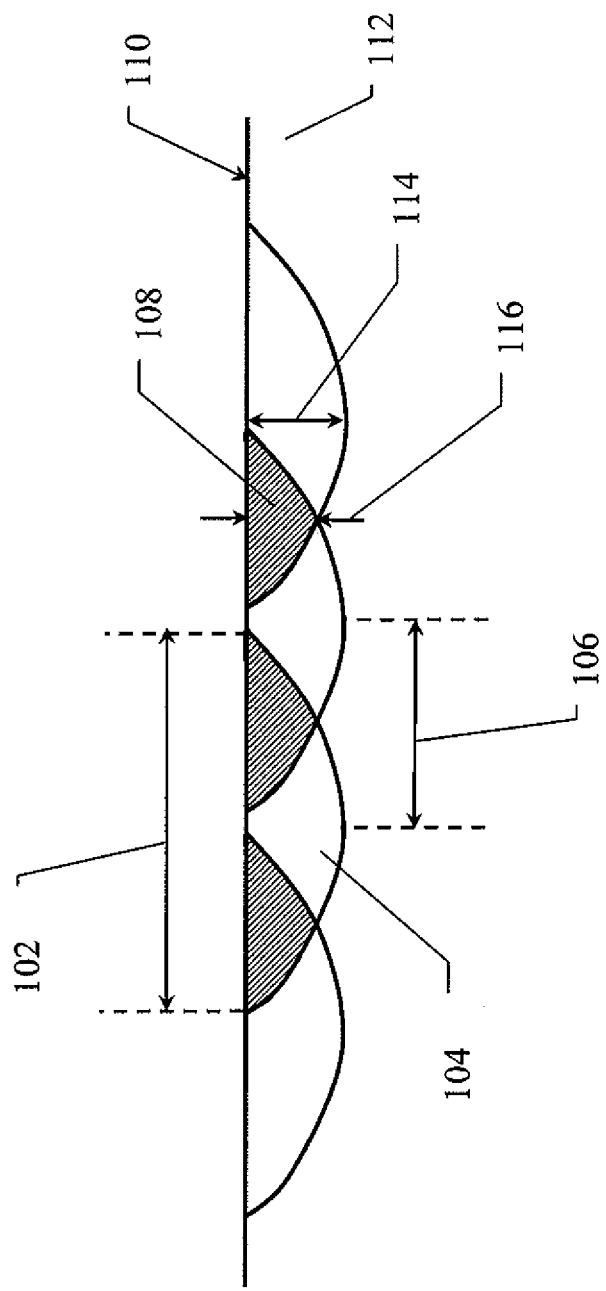

The ratio of the pitch 106 to the width 102 may be selected to provide a desired surface hardness, hardened depth, and/or uniformity of the hardness across the surface 110 of the component 112. As discussed above, there are competing factors associated with a reduced and increased pitch 106 to width 102 ratio. Specifically, as the pitch 106 to width 102 ratio increases as shown in FIG. 2A, so that there is less overlap between adjacent irradiated bands, the depth of the double-hardened zone 108 tends to decrease as does the hardness of the double-hardened zone 108. However, more of the hardened zone 104, which may have a greater hardness than the double-hardened zone 108, is represented at the surface 110 of the component 112. Conversely, as the pitch 106 to width 102 ratio decreases as shown in FIG. 2B, there is an increasing overlap between adjacent bands resulting in a greater double-hardened zone 108 surface area. This produces an average surface hardness (i.e., the average of the hardness of the hardened zone 104 and the double-hardened zone 108 on an exposed surface area basis) that is reduced relative to the hardness of the hardened zone 104, but also produces a more uniform depth of the hardened surface 110. Further, at relatively low pitch 106 to width 102 ratios, the ratio of the hardness of the double-hardened zone 108 to the hardness of the hardened zone 104 remains relatively high. These considerations indicate that there is an optimal range of pitch 106 to width 102 ratios that can produce a relatively uniform desired surface hardness along with a desired hardened depth. In an embodiment, the pitch 106 to width 102 ratio may range from about 0.4 to about 0.8, or alternatively about 0.5 to about 0.78. It can be noted that the pitch to width ratio is one way of describing the degree of overlap between the plurality of bands of irradiated material. As illustrated in the examples presented below, a pitch 106 to width 102 ratio below about 0.4 to about 0.5 increases additional processing costs due to increased number of laser beam passes needed to cover a given surface area. Further, a pitch 106 to width 102 ratio above about 0.78 to about 0.8 results in a decreased hardness of the double-hardened zone 108 and a reduction in the uniformity of the hardened depth across the surface 110 of the component 112.

Throughout the irradiation process as described herein, the surface appearance and/or finish of the component remain the substantially the same though the surface properties may change as described herein. In an embodiment, the laser beam may irradiate the surface of the component, heat the surface, and produce the hardening without creating any surface features that may need to be processed in a subsequent processing step as discussed in more detail below. While further steps may not be required, some final surface preparation processes may nevertheless be carried out as desired. For example, the surface may be polished, painted, or coated to improve and/or alter the appearance of the surface of the component. Further, the component may be joined, coupled, and/or incorporated into or with another component or components to form a larger component or tool. Alternatively, the component may be further tempered or treated to produce any desired surface properties. In an embodiment in which the component is or forms part of a wellbore or oilfield tool, the component may be disposed within a wellbore after the completion of the irradiation and any optional surface preparation processes.

In an embodiment, the laser hardening process described herein may be used to produce a completed or nearly completed component without any additional hardening processes. In traditional induction and flame heating surface treatment methods, the component is usually subjected to further treatment procedures after the surface treatment process to correct any deformation or warping caused by the heating and quenching of the component. Additional milling or processing steps may also be required to remove any extra materials or surface damage caused by the surface treatment procedures. Further polishing or finishing steps may then be needed in order to produce the completed component. By contrast, in an embodiment of the laser hardening process disclosed herein, the laser hardening process using a pitch to width ratio of between about 0.5 and about 0.78 may not result in any surface warping or damage needing any further processing steps. While some additional processing steps may be carried out as described above, the process may be substantially free of any additional steps that affect the surface hardness or correct for damage occurring during the surface hardening process. Accordingly, a process according to an embodiment may be described as consisting essentially of: providing a component comprising a surface formed from a metallic material; and irradiating the surface with a laser beam to form a plurality of bands of irradiated material, where the laser beam has a pitch to width ratio of between about 0.5 and about 0.78. Additional completion steps that do not substantially affect the surface hardness or correct for defects introduced in the surface hardness process are not considered to substantially affect the laser hardened component or method. Once the laser hardening method has been performed, the resulting component may be used for its intended purpose, for example, for use in a wellbore or in association with a oilfield operation.

To facilitate a better understanding of the present invention, the following examples of certain aspects of some embodiments are given. In no way should the following examples be read to limit, or define, the entire scope of the invention.

Example 1

A laser system having a power output of about 1-4 KW, a beam width of 6 mm, and a travel speed of about 3.5 m/min was used to treat a component formed from AISI 4140 steel to a depth of 1 mm. The pitch to width ratio was selected to be about 0.84 for this example. The AISI 4140 steel component was initially quenched and tempered to a hardness of 30-32 Rockwell C before being irradiated with the laser beam.

Figure 3:
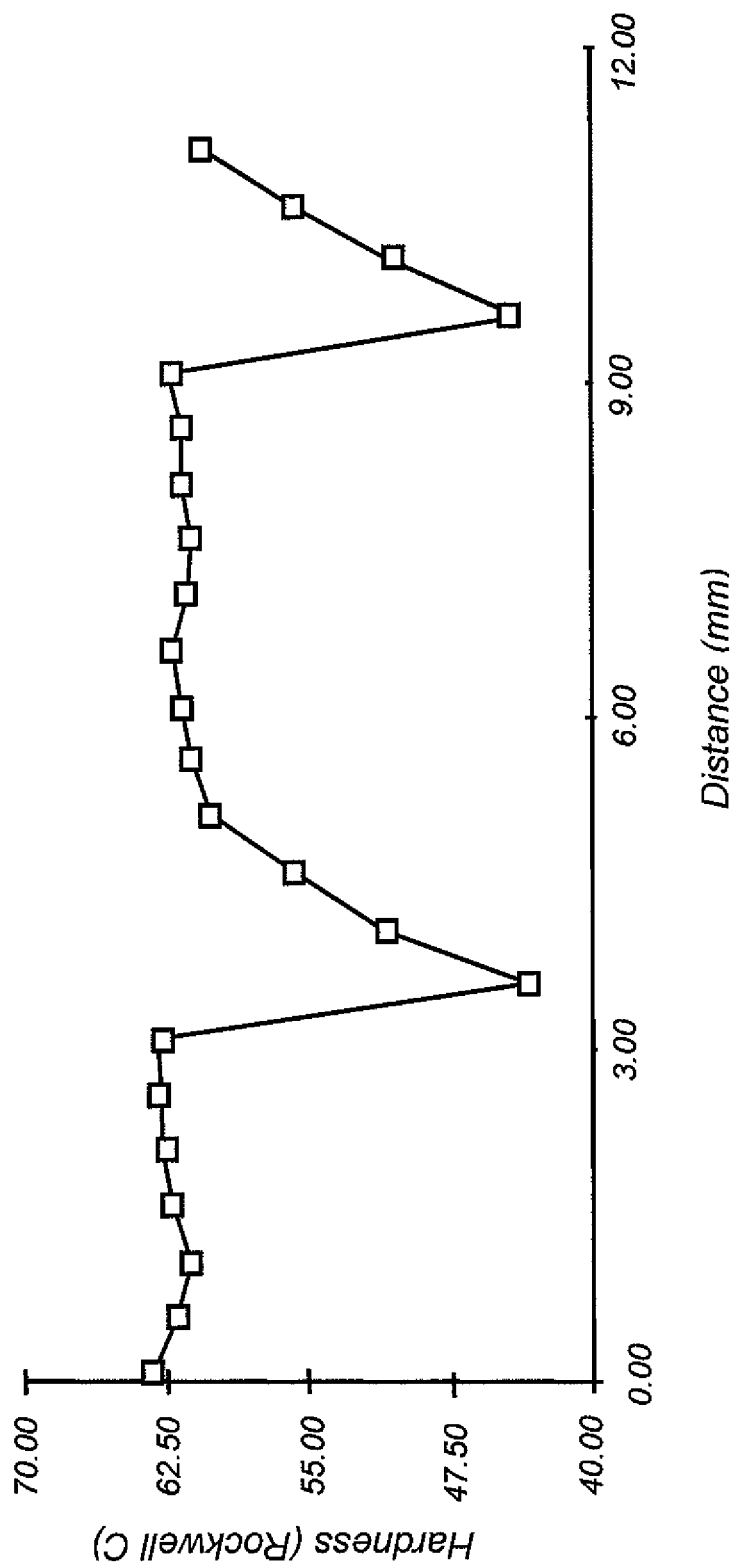
FIG. 3 is a graph of the hardness versus the distance along the surface according to an embodiment.

The surface hardness of the component along a portion of the surface after the irradiation was tested and the results are shown in FIG. 3. As shown in FIG. 3, a hardness of about 62.5 Rockwell C was obtained in the hardened zones 104 and a reduced hardness of about 43-44 Rockwell C was obtained in the double-hardened zones 108. The depth 114 of the treatment was measured to be about 0.96 mm in the hardened zone centerline and about 0.18 mm in the double-hardened zone centerline 116.

This example illustrates that at a pitch to width ratio of 0.84, the ratio of the double-hardened zone hardness to a hardened zone hardness was about 0.69, and the ratio of the centerline depth of the hardened zone to the depth of the double-hardened zone was about 0.19. Thus, the non-uniform hardness distribution and depth distribution may result in insufficient wear and/or corrosion resistance of the component at least for some applications.

Example 2

Figure 4:
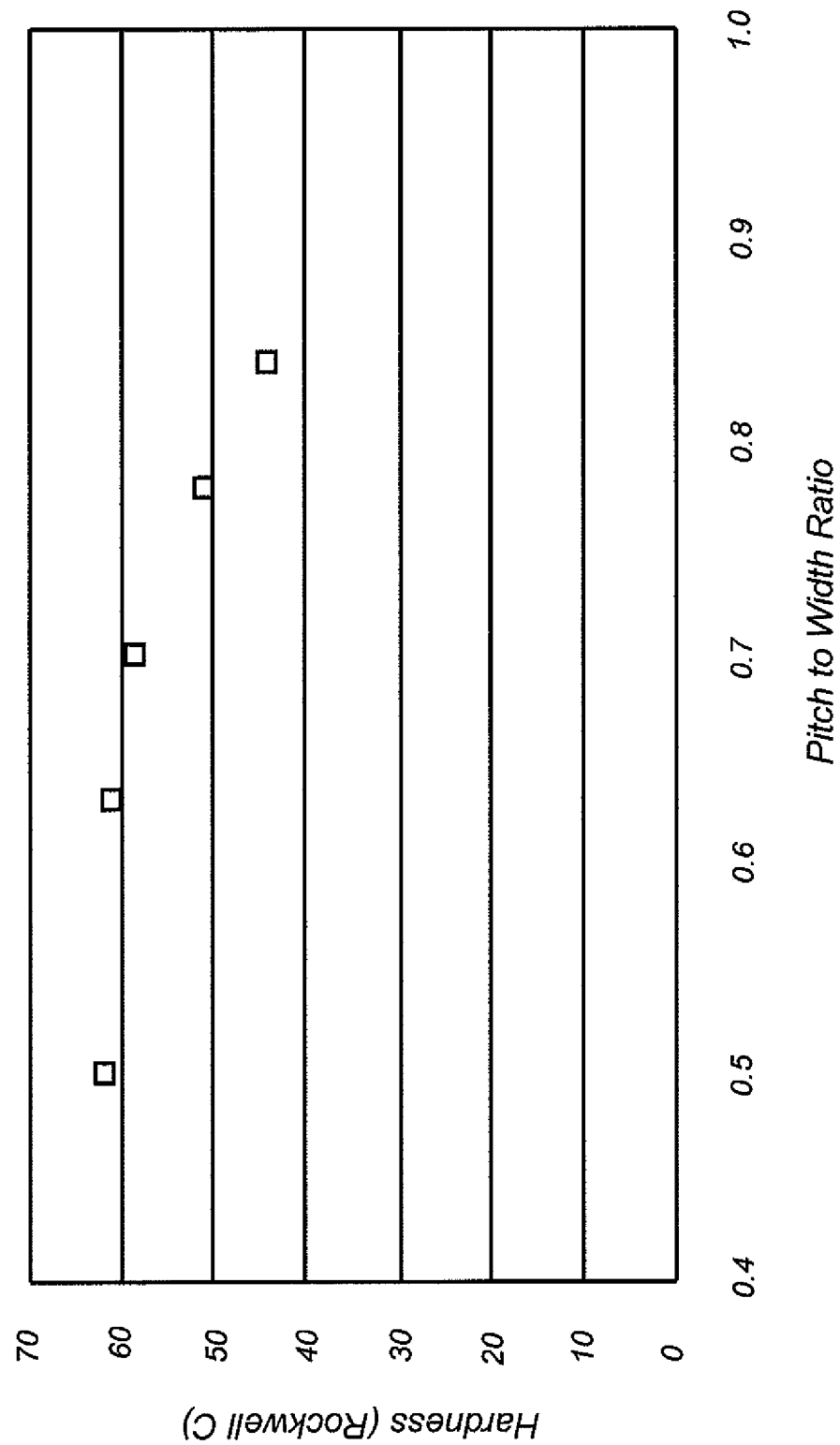
FIG. 4 is a graph of the hardness of double-hardened zone versus the pitch to width ratio according to an embodiment.

In another example, the laser system as described above in Example 1 was used to laser harden a number of samples of AISI 4140 steel at varying pitch to width ratios of 0.5, 0.63, 0.70, 0.78, and 0.84. The measured hardness values of the double-hardened zone were plotted against the pitch to width ratio, and the results are shown in FIG. 4. As shown in FIG. 4, the hardness of the double-hardened zone begins to decrease noticeably above a pitch to width ratio of about 0.78. More specifically, the ratio of the double-hardened zone hardness to a hardened zone hardness was about 0.82 at a pitch to width ratio of about 0.78, and the ratio of the double-hardened zone hardness to a hardened zone hardness was about 0.94 at a pitch to width ratio of about 0.73. Thus, the selection of a pitch to width ratio of less than about 0.78 would produce a relatively uniform hardness across the surface of the component.

The depth of the hardened zone was also measured and the results for four of the pitch to width ratios are presented below in Table 1.

TABLE 1

Depth Ratios of Maximum to Minimum at Selected Pitch to Width Ratios

| Pitch to Width Ratio | Ratio of the Centerline Depth of the Hardened Zone to the Center Depth of the Double-Hardened Zone |
| --- | --- |
| 0.84 | 0.25 |
| 0.78 | 0.69 |
| 0.70 | 0.70 |
| 0.63 | 0.90 |

As expected, the centerline depth of the hardened zone was measured as the maximum hardened depth obtained, and the center of the double-hardened zone was the minimum depth obtained. As shown in Table 1, the pitch to width ratio of about 0.78 produced a ratio of the centerline depth of the hardened zone to the center depth of the double-hardened zone of about 0.69, and pitch to width ratios less than 0.78 produced ratios of the centerline depth of the hardened zone to the center depth of the double-hardened zone of greater than 0.69. Accordingly, a pitch to width ratio of less than about 0.78 may be expected to produce a ratio of the centerline depth of the hardened zone to the center depth of the double-hardened zone of greater than 0.69, which may result in a uniform depth profile across the surface of the component.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A method of laser hardening comprising:
   irradiating a surface of a component with a laser beam to form a first band of irradiated material, wherein irradiating the surface comprises heating the surface while remaining below the component's melting point; and
   irradiating the surface of the component with the laser beam to form a second band of irradiated material that overlaps the first band of irradiated material, wherein the second band is adjacent the first band;
   wherein the first band and the second band have a pitch to width ratio of between about 0.63 and about 0.78.

2. The method of claim 1, wherein the component comprises a metallic material capable of undergoing a structural transformation when exposed to a heating and cooling cycle.

3. The method of claim 2, wherein the metallic material comprises a carbon steel.

4. The method of claim 3, wherein the carbon steel comprises a component selected from the group consisting of: nickel, chromium, molybdenum, silicon, phosphorus, manganese, vanadium, sulfur, and any combination thereof.

5. The method of claim 3 wherein the metallic material comprises at least one carbon steel selected from the group consisting of: AISI 4130, AISI 4140, AISI 4145, and AISI 4155.

6. The method of claim 1, wherein the first band has a hardened depth, wherein the first band overlaps the second band to define an overlap area, wherein the overlap area has a double-hardened depth, and wherein a ratio of the double-hardened depth to the hardened depth is greater than about 0.7.

7. The method of claim 1, further comprising performing a surface preparation procedure.

8. A method of laser hardening comprising:
   irradiating a surface of a component with a laser beam to form a plurality of adjacent bands of irradiated material, wherein irradiating the surface comprises heating the surface while remaining below the component's melting point, wherein adjacent bands of the plurality of bands overlap to define an overlap area therebetween,
wherein the plurality of adjacent bands have a hardened depth,
wherein the overlap area has a double-hardened depth,
wherein a ratio of the double-hardened depth to the hardened depth is greater than 0.7, and wherein the adjacent bands have a pitch to width ratio greater than 0.63.

9. The method of claim 8, wherein the component comprises a metallic material capable of undergoing a structural transformation when exposed to a heating and cooling cycle.

10. The method of claim 8, wherein the component comprises a wellbore tool, a drill bit, a wellbore tubular, a completion assembly, a drilling rig component, or a workover rig component.

11. The method of claim 8, wherein the laser beam is produced by a laser, and wherein the laser comprises a YAG laser, a $CO_2$ laser, or a high output direct diode laser.

12. The method of claim 11, wherein the laser has a power output ranging from about 0.1 Kilowatts (KW) to about 10 KW.

13. The method of claim 8, wherein the laser beam has a beam width in the range of about 1 millimeter (mm) to about 10 mm.

14. The method of claim 8, wherein irradiating the surface of the component with the laser beam comprises moving the laser beam relative to the surface of the component at a rate of greater than about 0.5 meters per minute.

15. The method of claim 8, wherein the plurality of adjacent bands of irradiate material have a hardness value of greater than about 70% of a maximum hardness for a material forming the component.

16. The method of claim 8, wherein the overlap area has a hardness value of greater than about 60% of a maximum hardness for a material forming the component.

17. A method of laser hardening consisting essentially of:
providing a component comprising a surface formed from a metallic material; and
irradiating the surface with a laser beam to form a plurality of bands of irradiated material, wherein irradiating the surface comprises heating the surface while remaining below the component's melting point;
wherein adjacent bands of the plurality of bands of irradiated material have a pitch to width ratio of between about 0.63 and about 0.78.

18. The method of claim 17, wherein irradiating the surface with the laser beam heats the irradiated surface above a transformation temperature of the metallic material.

19. The method of claim 17, wherein adjacent bands of the plurality of bands overlap to define an overlap area, wherein the plurality of bands have a hardened depth, wherein the overlap area has a double-hardened depth, and wherein a ratio of the double-hardened depth to the hardened depth is greater than 0.7.

20. The method of claim 19, wherein the plurality of bands have a hardened hardness, wherein the overlap area has a double-hardened hardness, and wherein a ratio of the double-hardened hardness to the hardened hardness is greater than about 0.6.

* * * * *